US008430358B2

(12) United States Patent
Schneider et al.

(10) Patent No.: US 8,430,358 B2
(45) Date of Patent: Apr. 30, 2013

(54) STORAGE COMPARTMENT MODULE WITH AN INTEGRATED SUPPLY CHANNEL FOR OPTIMIZED INSTALLATION

(75) Inventors: Uwe Schneider, Jork (DE); Thorsten Gerber, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/459,976

(22) Filed: Apr. 30, 2012

(65) Prior Publication Data

US 2012/0228425 A1    Sep. 13, 2012

Related U.S. Application Data

(63) Continuation of application No. PCT/EP2010/065797, filed on Oct. 20, 2010.

(60) Provisional application No. 61/280,167, filed on Oct. 30, 2009.

(30) Foreign Application Priority Data

Oct. 30, 2009  (DE) .................. 10 2009 051 362

(51) Int. Cl.
*B64D 11/00* (2006.01)
(52) U.S. Cl.
USPC ................... 244/118.5; 244/118.6; 244/118.1
(58) Field of Classification Search ............... 244/118.5, 244/118.6, 118.1
See application file for complete search history.

(56) References Cited

U.S. PATENT DOCUMENTS

| 5,383,628 | A | * | 1/1995 | Harriehausen et al. .... 244/118.1 |
| 5,549,258 | A | * | 8/1996 | Hart et al. .................. 244/118.1 |
| 5,556,332 | A | * | 9/1996 | Schumacher ................... 454/76 |
| 5,651,733 | A | * | 7/1997 | Schumacher ................... 454/76 |
| 5,687,929 | A | * | 11/1997 | Hart et al. .................. 244/118.1 |
| 5,716,027 | A | * | 2/1998 | Hart et al. .................. 244/118.1 |
| 5,842,668 | A | * | 12/1998 | Spencer ..................... 244/118.1 |
| 5,921,670 | A | * | 7/1999 | Schumacher et al. ......... 362/480 |
| 5,938,149 | A | * | 8/1999 | Terwesten .................. 244/118.5 |
| 5,985,362 | A | * | 11/1999 | Specht et al. ................ 427/236 |
| 6,007,024 | A | * | 12/1999 | Stephan ..................... 244/118.1 |
| 6,454,209 | B1 | * | 9/2002 | Bock et al. ................. 244/118.5 |
| 6,484,969 | B2 | * | 11/2002 | Sprenger et al. ........... 244/118.5 |
| 6,619,716 | B1 | * | 9/2003 | Sturt ........................... 296/37.8 |
| 6,633,347 | B2 | * | 10/2003 | Kitazawa ..................... 348/837 |
| 6,874,730 | B2 | * | 4/2005 | Harasta ..................... 244/118.5 |

(Continued)

FOREIGN PATENT DOCUMENTS

| DE | 29907980 U1 | 7/1999 |
| DE | 102004043910 A1 | 3/2006 |

(Continued)

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

A hatrack module with integral service channel for optimized mounting comprises a housing with a hatrack accommodation space and a passenger service channel, a hatrack with laterally arranged guide elements, and at least one passenger service unit, wherein in each case a guide rail is arranged on the sidewalls of the hatrack accommodation space, and wherein a wall of the housing comprises at least one reach-through access opening, and wherein the guide elements of the hatrack can be made to engage the guide rails on the housing.

12 Claims, 6 Drawing Sheets

U.S. PATENT DOCUMENTS

| | | | |
|---|---|---|---|
| 7,258,406 B2 * | 8/2007 | Stephan et al. | 312/246 |
| 7,379,125 B2 * | 5/2008 | Chang | 348/837 |
| 8,028,957 B2 * | 10/2011 | Wolf et al. | 244/118.5 |
| 2001/0011692 A1 * | 8/2001 | Sprenger et al. | 244/118.5 |
| 2004/0212746 A1 * | 10/2004 | Rosen | 348/837 |
| 2006/0049310 A1 * | 3/2006 | Park et al. | 244/118.5 |
| 2006/0091257 A1 * | 5/2006 | Melberg et al. | 244/118.5 |
| 2007/0095980 A1 * | 5/2007 | Bock | 244/118.1 |
| 2011/0240796 A1 * | 10/2011 | Schneider | 244/118.5 |

FOREIGN PATENT DOCUMENTS

| | | |
|---|---|---|
| DE | 102006045189 A1 | 4/2008 |
| DE | 102007009278 A1 | 8/2008 |
| DE | 102007030330 A1 | 1/2009 |
| DE | 102007030331 A1 | 1/2009 |
| EP | 861781 A2 | 9/1998 |
| EP | 1216920 A1 | 6/2002 |
| EP | 1293383 A1 | 3/2003 |
| WO | 2009003945 A1 | 1/2009 |

\* cited by examiner

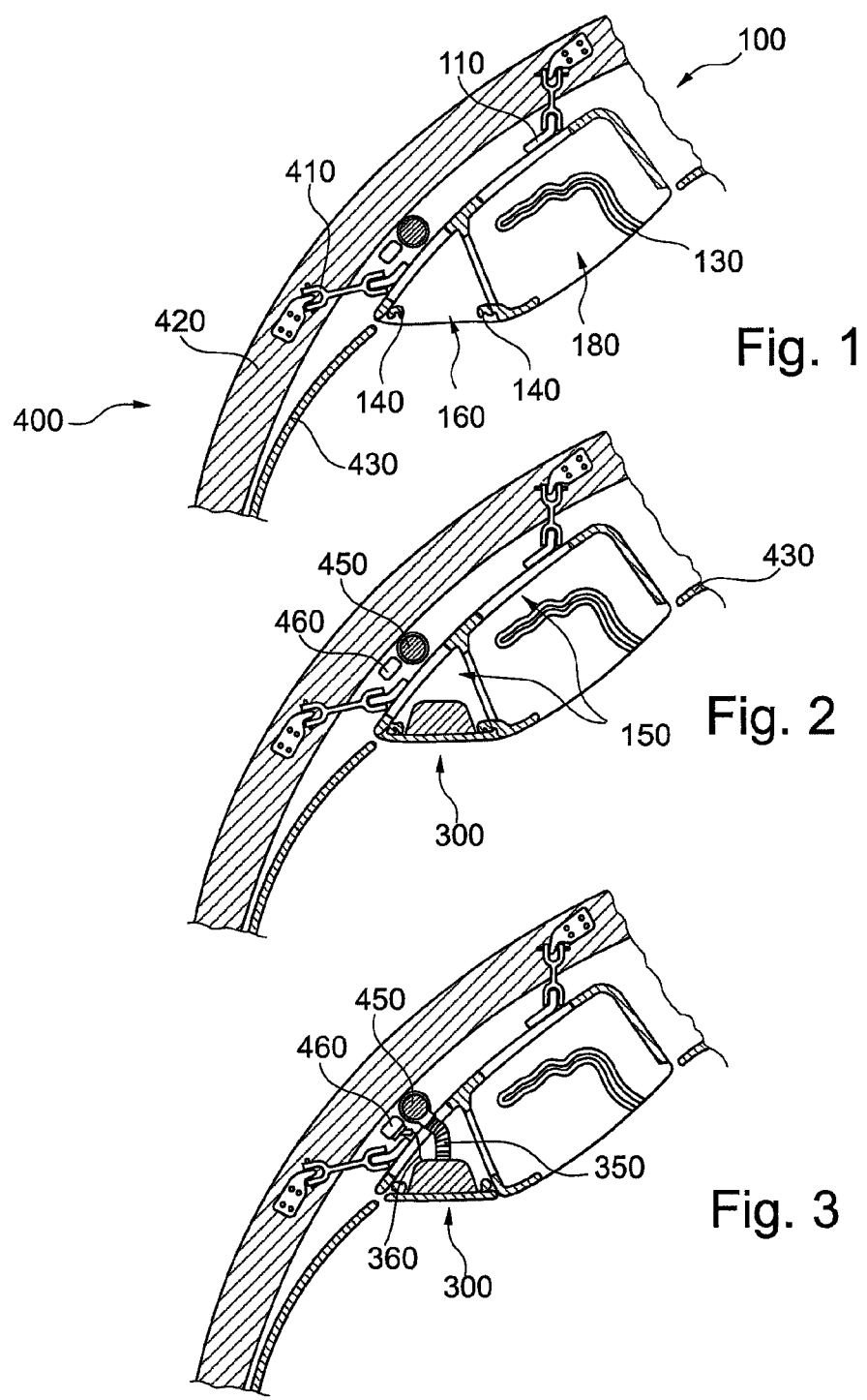

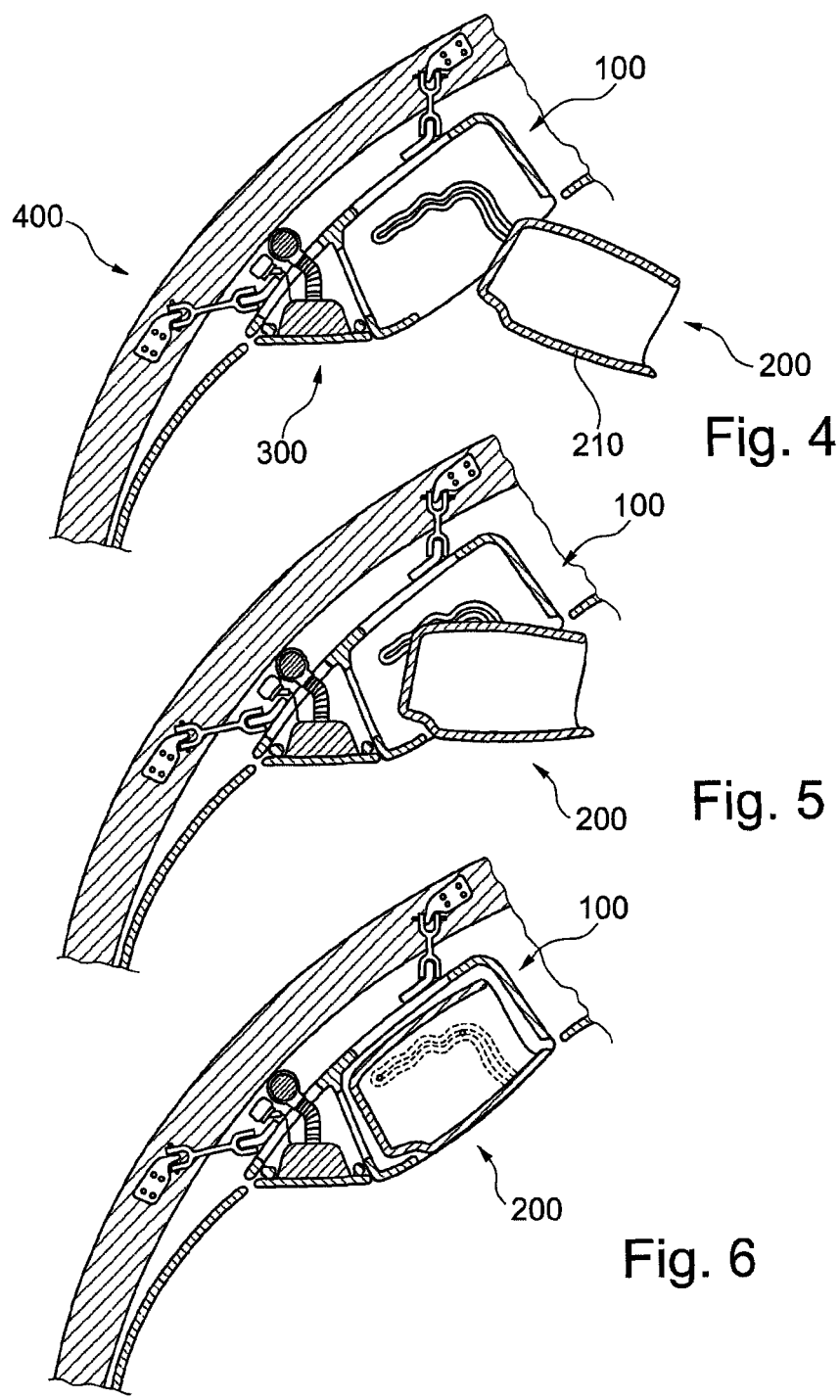

Detail Y

STORAGE COMPARTMENT MODULE WITH AN INTEGRATED SUPPLY CHANNEL FOR OPTIMIZED INSTALLATION

CROSS-REFERENCE TO RELATED APPLICATIONS

The present application is a continuation of International Application No. PCT/EP2010/065797, filed Oct. 20, 2010, published in German, which claims the benefit of the filing date of U.S. Provisional Patent Application No. 61/280,167 filed Oct. 30, 2009 and of German Patent Application No. 10 2009 051 362.0 filed Oct. 30, 2009 the disclosures of which applications are hereby incorporated herein by reference.

TECHNICAL FIELD

The invention relates to a hatrack or to a hatrack module, and to a method for installing the aforesaid. In particular, the invention relates to a hatrack module with integral service channel for optimized mounting. Furthermore, the invention relates to the use of a hatrack module in an aircraft or vehicle, and to an aircraft comprising a hatrack module.

BACKGROUND TO THE INVENTION

In order to supply aircraft passengers with emergency oxygen, incoming air and/or electrical systems, above the seat rows in the direction of flight a passenger service channel (PSC) is provided, on which passenger service channel functional panels and so-called functionless infill panels are aligned. For fastening whatever panels a two-rail system is commonly used, which in turn is fastened to the hatrack module, into which two-rail system the panels are latched with mounts so as to be slidable in the direction of flight. In this arrangement the position in cross section (Y/Z-coordinate) is always unequivocal, while in the direction of flight (X-coordinate) it depends on the desired cabin layout or seating layout.

Arranging the PSC functional panels in the direction of flight thus needs to take place individually for each aircraft layout relating to the seating position, so that passengers can comfortably use each function from their seats.

At present no movable lateral hatracks are known for passenger aircraft of the type A320. This is originally due to the available space with the respective cross sections not allowing generous arrangements with pivoting regions. In order to allow adequate pivoting of a hatrack on the aircraft X-axis, in a hatrack with a simple bearing arrangement the aircraft fuselage would have to be broken open. This means that the aircraft fuselage would have to deviate too much from its ideal circular shape. Pivotally held hatracks comprising a simple bearing arrangement are known from the A380 and the A350. Due to the larger fuselage diameter, in these aircraft the problem of the required pivoting region does not take center stage; however, in these aircraft the pivot point is in part removed from the center of gravity to such an extent that manual forces and ergonomics are limited.

The present-day installation sequence of passenger service units (PSUs) commences, after the hatracks have been mounted, with clicking into place the locking devices on the fuselage side into the so-called PSC rails, wherein the aforesaid are then, pivoted open, in other words hanging downwards perpendicularly, moved together in the PSC rails so that they abut. In this end position, subsequently the electrical connectors and air connections are connected on the functional panels, which connectors and connections are, as a rule, held on the underside of the hatracks or directly on the structure. Prior to pivoting the still hanging-down PSUs into their horizontal end positions, all the cables and hoses must first be protected according to design specifications, and must be tied without sagging and held in place.

DE 10 2007 030331 A1 and WO 2009 003945 A1 describe a hatrack module for an interior of an aircraft, wherein the hatrack module comprises at least one container and at least one housing for accommodating the container, and wherein at least one passenger service channel is integrated in the housing.

SUMMARY OF THE INVENTION

It is an object of the invention to provide a hatrack module that is easier to install.

These and further objects are met by the subject-matter of the respective independent claims. Further embodiments are described in the respective dependent claims.

Generally-speaking, a hatrack module according to the invention comprises a housing with a hatrack accommodation space and a passenger service channel, a hatrack with laterally arranged guide elements and at least one passenger service unit, wherein in each case a bearing element is arranged on the sidewalls of the hatrack accommodation space, and wherein a wall of the housing comprises at least one reach-through access opening, and wherein the guide elements of the hatrack can be made to engage the bearing elements on the housing.

In contrast to the very time-consuming and ergonomically unsatisfactory installation of a complete hatrack with a subsequently-to-be installed service channel (or with a complete, pre-configured, hatrack module) in the present case the installation sequence is divided into two process steps according to the specific requirements of hatrack installation in a confined aircraft fuselage and the necessary individual equipment level of the service channel. As a result of improved access, these process steps are considerably sped up, and can furthermore be carried out in a position that facilitates this work. The reach-through access opening for reaching the fastening elements on the structure side of the hatrack module housings significantly facilitate installation and alignment of the housing.

According to one embodiment of the invention, the reach-through access opening is situated in a rear wall of the housing. In this way the retainers located on the structural side of the hatrack module housing can better be connected, by way of tie rods, to the fuselage structure of the aircraft.

According to another embodiment of the invention, the reach-through access opening is situated in a wall of the housing between the hatrack accommodation space and the passenger service channel. When the service channel is equipped with the PSUs and is latched into its horizontal end position, by means of the reach-through access opening in the housing easy and ergonomic connection of the PSUs to the electrical connections, oxygen connections and individual air connections can be made possible at eye height.

Furthermore, considerable savings in weight are made possible, because neither hinges for folding nor excess cable lengths or hose lengths with corresponding abrasion protection sleeves and their separate mounts are necessary for mounting the passenger service units (PSUs). Connection of the PSUs in their actual end positions can thus be ensured in a simple, reliable and safe manner.

According to one embodiment of the invention, the bearing elements on the hatrack accommodation space are guide rails, while the guide elements of the hatrack are rollers, wherein on each side of the hatrack two rollers are arranged in such a manner that the hatrack is movable along the guide rails between an open position and a closed position. In other words the movement of the hatrack between an open position and a closed position is implemented by means of a cam mechanism that is designed by way of two rollers and a corresponding rail.

It should be noted that the bearing elements could also, for example, be a receiving device for a movement axis of a hatrack, or any other suitable bearing element for movably mounting a hatrack. Corresponding elements can be provided on the hatracks.

Following fastening of the housing to the aircraft wall, and following insertion of the PSUs in the passenger service channel, a hatrack is installed in the corresponding guide rails of the housing, for example by inserting the rollers located on the hatrack sides. In this arrangement, so-called insertion inclines on the guide rails can support one-person installation of the hatrack.

In the case of a hatrack with a movable pivot point, which hatrack makes it possible to achieve space-saving movement between two ideal end positions, the hatrack module according to one embodiment of the invention makes it possible to implement a complex movement path on a closed rail (one rail per side), in each case comprising two bearing points (ball-bearing mounted polyamide rollers). Since the rails lead from the edge surface at the housing sides, simple one-person installation of the roller-guided hatrack by way of self-positioning (insertion inclines) on the rails is possible.

The movement path during opening (first phase) can be selected in such a manner that at first the pivot point is away from the center of gravity towards the structural side in order to ensure guaranteed and quick automatic opening of the hatrack, wherein said pivot point moves continuously towards the center of gravity. The further movement path during opening can be selected so that the pivot point continuously approaches the center of gravity in order to prevent further gravity-induced acceleration.

The further movement path during opening (second phase) can result in a change in the pivot point beyond the center of gravity in the direction towards the passenger. During this process the speed of the hatrack is reduced in order to deplete the kinetic energy prior to reaching the end position.

The further movement path during opening (third phase) can then be selected in such a manner that the pivot point moves back over the center of gravity towards the structural side in order to ensure a safe and secure bearing arrangement of the chute in its fully-opened end position.

During closing, this very change in the pivot point can be perceptibly overcome again as feedback or resistance. The movement path during closing can be selected in such a manner that, after this resistance has been overcome, the pivot point moves away from the center of gravity towards the structural side, in other words the weight of the hatrack supports passengers in their attempt to overcome gravity. The further movement path up to final closing can, furthermore, be selected in such a manner that after a certain kinetic energy has been attained in the previous acceleration phase, final closing can be effected with little manual force.

According to a further embodiment of the invention, the hatrack module, furthermore, comprises a locking plug that is suitable for closing off one end of a guide rail, wherein the locking plugs, could be conical locking plugs so as to correspond to insertion inclines at the ends of the guide rails. Furthermore, the locking plugs can be held by means of grub screws, while at the same time comprising rubber buffers to provide end-stop damping.

According to a further embodiment of the invention, the passenger service unit can be an oxygen supply box, a loudspeaker, a headphone jack, a light, an air outlet for the air supply, a USB connector, a computer connector, and/or simply a panel.

The hatrack module can, furthermore, comprise a locking device so that the hatrack can be locked in a closed position in the housing.

It should be pointed out that the reach-through access openings as well as the cables and hoses of the PSUs and the rear of the latter are no longer visible to passengers after installation of the hatrack, that no acoustic disadvantages are to be expected as a result of the closed contour of the side panels with the PSC, with the hatrack module housing and with the hatrack to the ceiling lining, and that maintenance work on the PSUs merely requires deinstallation of the hatrack, a task that can be accomplished by one person in a matter of seconds.

According to a further embodiment of the invention, the movement path of the hatrack is determined in such a manner by means of the guide rails that during opening or closing the hatrack, i.e. in any position of the hatrack between an open position and a closed position, there is an essentially constant gap between an outside of the hatrack and an edge of the hatrack housing. In this way it can be ensured that in any position of the hatrack relative to the hatrack housing a uniform visual transition between the hatrack and the hatrack housing, and also the interior lining panels, exists. Furthermore, it is ensured that the rearward-arranged elements and structures of the hatrack module are at no time visible.

The hatrack, the hatrack housing and the guide rails can also match each other in such a manner that on all sides of the hatrack, in other words on the lateral, on the upper, and on the lower outer sides, there is a constant gap so that apart from the visual aspects, air cushioning of the movement of the hatrack is also provided.

This means that the hatrack accommodation space generates an air buffer when the hatrack is moved from an open position to a closed position, because the air situated behind the hatrack cannot escape quickly enough through the gap between the hatrack and the hatrack housing. On the other hand, air cannot flow quickly enough into the hatrack accommodation space when the hatrack is moved from a closed position to an open position, and consequently in this process, too, the movement is gently decelerated or cushioned.

In order to implement the movement cushioning effect so that it is independent of adjacent structures, according to a further embodiment of the invention one or several closing plates can be provided, by means of which one or several reach-through access openings can be closed.

Adjustability of movement cushioning can be implemented by a valve that influences the inflow of air into the hatrack accommodation space, or the outflow of air from the hatrack accommodation space. Such a valve can be provided either in a wall of the hatrack accommodation space or in a closing plate. It should be noted that it is also possible for several valves to be provided.

Furthermore, a valve for the outflow of air can differ from a valve for the inflow of air, or a valve can be designed such that the valve characteristics of the two opposite flow directions differ. In this arrangement it is also possible for the valve to completely close one of the flow directions. An example of this is described further below.

Furthermore, the valve can comprise a constant opening and a pass-through opening that can be regulated. The valve can comprise one or several rigid and/or flexible valve flaps, or a combination of the aforesaid.

According to a further aspect of the invention, a method for installing a hatrack module as described above comprises the following steps: attaching the housing of the hatrack module to the structure of the aircraft; inserting the at least one passenger service unit into the passenger service channel of the housing; connecting any connections of the passenger service unit to supply lines of the aircraft; inserting a hatrack into the hatrack accommodation space of the housing, wherein the guide elements on the hatrack engage the bearing elements on the housing.

It should be mentioned that embodiments of the invention are described with reference to various objects. In particular, some embodiments are described with reference to method-related claims, whereas other embodiments are described with reference to device-related claims. However, from the description above and below, the average person skilled in the art will gather that, unless otherwise determined, in addition to any combination of characteristics that forms part of one type of objects, also any combination of characteristics relating to the different objects is deemed to have been disclosed in this document.

The aspects described above, and further aspects, characteristics and advantages of the invention can also be gathered from the examples of the embodiments, which are described below with reference to the accompanying drawings.

BRIEF DESCRIPTION OF THE DRAWINGS

FIG. 1 shows a hatrack module according to a embodiment of the invention without the hatrack or a passenger service unit.

FIG. 2 shows the hatrack module of FIG. 1 with an installed passenger service unit.

FIG. 3 shows the hatrack module of FIG. 1 with a connected passenger service unit.

FIG. 4 shows the hatrack module of FIG. 1 with a hatrack at commencement of installation of the hatrack.

FIG. 5 shows the hatrack module of FIG. 1, wherein the hatrack is displaced in the direction of the closed position.

FIG. 6 shows the hatrack module of FIG. 1 including connected PSUs with the hatrack closed.

DETAILED DESCRIPTION OF THE EMBODIMENTS

Figure 7:
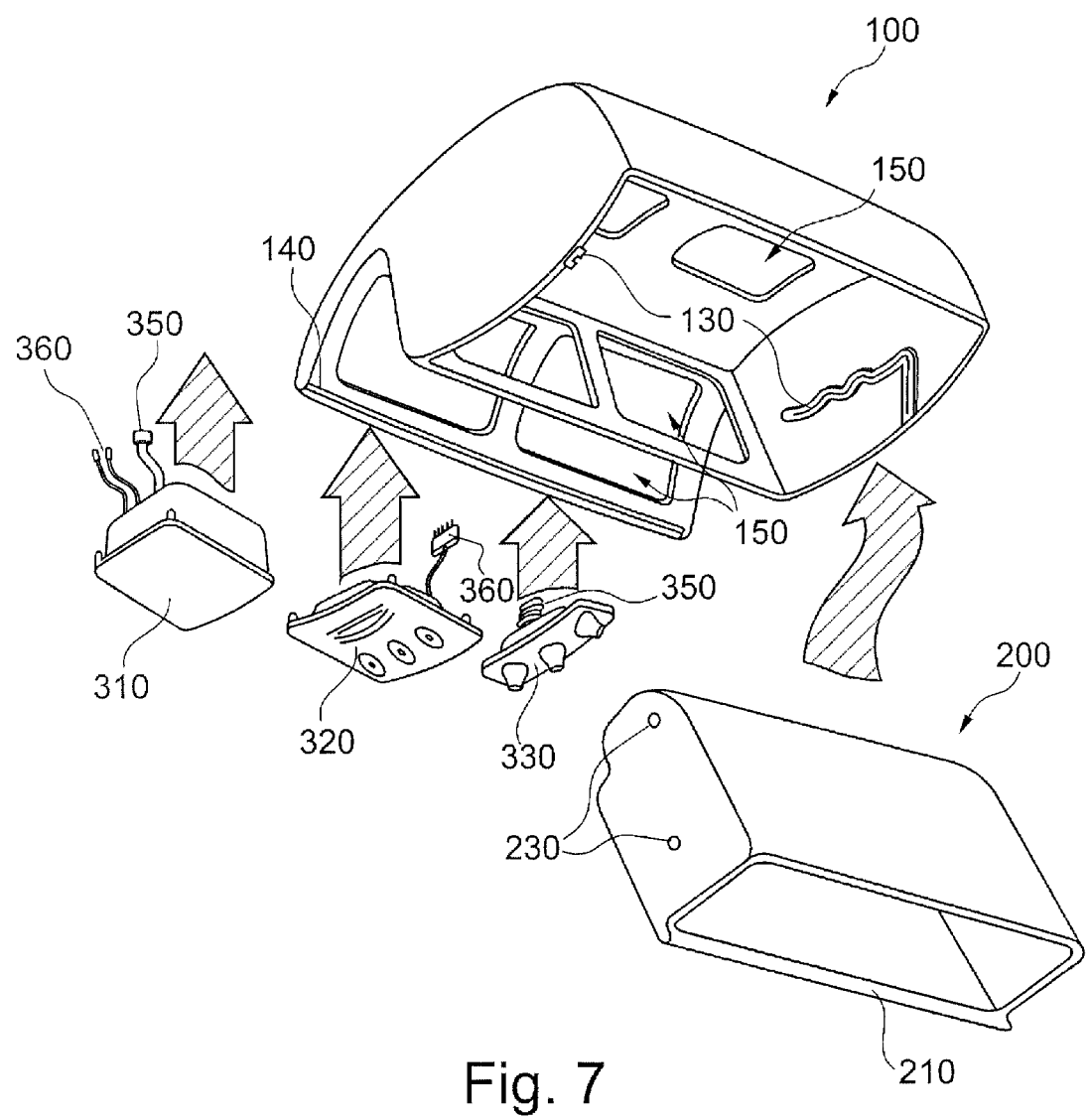
FIG. 7 shows a disaggregated component drawing of a hatrack module with a housing, with PSUs and with a hatrack according to one embodiment of the invention.

In contrast to the very time-consuming and ergonomically unsatisfactory installation of a complete hatrack module with a subsequently-to-be installed service channel (or with a complete, pre-configured, hatrack module) in the present case the installation sequence is divided into two process steps according to the specific requirements of hatrack installation in a confined aircraft fuselage and the necessary individual equipment level of the service channel. As a result of improved access, these process steps are considerably sped up, and can be carried out in a position that facilitates this work.

In the first instance, as shown in FIG. 1, a hatrack module housing 100 that can be designed as a drawer housing (sandwich) or carrier housing (metal or CFRP) for accommodating the guide rails 130 for the hatrack, and for accommodating the passenger service channel (PSC) rails 140 for the passenger service units (PSUs) 300, is fastened to the structure 400 of the aircraft, for example by way of adjustable tie rods. The reach-through access opening or reach-through access openings 150, which can be generously designed, for reaching the fastening elements 110, 410 on the structural side of the hatrack module housing 100, considerably facilitate installation and alignment of the housing. Ergonomic two-person installation is possible as a result of half the weight and the easy-to-hold contour, as well as by the frontal access to the fastening elements.

Generally speaking, FIG. 1 shows a hatrack module housing 100 that is attached to a fuselage structure of an aircraft. The aircraft structure 400 comprises mounting devices 410 to which a hatrack module can be fastened. Furthermore, the aircraft structure 400 comprises a wall 420 as well as an interior lining 430. The hatrack module comprises fastening elements 110 that can be made to engage the fastening elements 410 of the aircraft structure 400. Furthermore, on the inside of a hatrack accommodation space 180, the hatrack module housing 100 comprises two guide rails 130 for accommodating a hatrack. Furthermore, rails 140 are provided on the housing 100, on which rails 140 the PSUs 300 can be clicked into place. The section view of FIG. 1 shows a hatrack module housing 100 and an aircraft structure 400, wherein the hatrack module housing comprises reach-through access openings 150 that can be arranged not only in the rear wall of the housing 100 in the region of the hatrack accommodation space 180 and of the passenger service channel 160, but also between the hatrack accommodation space 180 and the passenger service channel 160.

In the illustration of FIG. 2 the service channel 160 is equipped with a PSU 300, wherein the PSU is latched in horizontal end position in the rails 140. This procedure does not require an intermediate installation stage with subsequent hinging of the PSUs, as is the case in conventional installation. In the installed state the PSU, clicked into the rails 140 of the housing 100 of the hatrack module, is situated in close proximity to the supply lines 450 and 460 that are arranged on the inside of the outside wall 420 of the aircraft structure 400.

As shown in FIG. 3, the reach-through access opening 150 between the hatrack accommodation space 180 and the passenger service channel 160 makes it possible to achieve simple and ergonomic connecting of the PSU connections to the electrical connections, oxygen connections and individual air connections 450, 460 at eye level. It should be mentioned that considerable weight savings are achieved in that the passenger service units (PSUs) do not require hinges for folding nor excessive lengths of cables or hoses with corresponding abrasion protection sleeves and their separate mounts for fastening. Simple and safe working is ensured in that connecting the PSUs takes place in their actual end positions.

As shown in FIG. 4, after the installation states shown in FIGS. 1 to 3, an outside 210 of the hatrack 200 is installed in that the rollers 230 located on the hatrack sides are inserted into the guide rails 130 of the housing 100. In this process, so-called insertion inclines on the guide rails 130 support self-positioning and one-person installation of the hatrack 200. As soon as the second pair of rollers has been inserted, the ends of the guide rails can be closed by means of so-called conical locking plugs (as a counterpart to the insertion inclines). These locking plugs 120 can be held by means of grub screws and at the same time comprise rubber dampers for end-stop damping.

FIG. 5 shows the hatrack 200 in its open position (end stop of the rollers against the locking plugs in the ends of the guide rails). The illustration shows that the hatrack 200 is arranged in a position in which, for example, an item of cabin baggage can easily be placed in horizontal direction into the hatrack. Furthermore, the illustration shows that, after installation of the hatrack, because of constant movement gaps in the X-direction and small system gaps in the Y/Z directions, the reach-through access openings, the cables and hoses of the PSUs and their rear, as well as the kinematics (guide rails and rollers) are no longer visible to passengers. This can be achieved by means of the special progression of the guide rails, and applies both to the open state and to the closed state of the hatrack, and also to any position in-between.

FIG. 6 shows a hatrack module with a closed hatrack. The illustration shows that the hatrack module with the PSU and the hatrack can be esthetically integrated in the lining of the interior of an aircraft. Furthermore, no acoustic disadvantages are to be expected as a result of the closed contour of the side panels with the PSC, with the hatrack module housing and with the hatrack to the ceiling lining.

Maintenance work on the PSUs merely requires deinstallation of the hatrack, a task that can be accomplished by one person in a matter of a few seconds.

FIG. 7 shows an isometric disaggregated component drawing of a hatrack module according to the invention. The shown hatrack module with integral service channel for optimized mounting comprises a fixed (rigid) hatrack module housing 100, designed as a drawer housing (sandwich) or carrier housing (metal or CFRP) for accommodating the guide rails 130 for the hatrack, and for accommodating the passenger service channel (PSC) rails 140 for the passenger service units 310, 320, 330 (PSUs). Generous reach-through access openings 150 for reaching the fastening elements for installation to the aircraft structure are designed to facilitate installation and alignment of the housing 100 to a considerable extent. Generous reach-through access openings 150 in the housing towards the service channel are intended to make it possible to achieve simple and ergonomic connection of the PSUs to the electrical connections, oxygen connections, and individual air connections at eye level.

The hatrack 200 itself represents the visible part towards the cabin; in its installed state said hatrack 200 covers up all the cables and hoses of the PSUs and their rear as well as the kinematics (guide rails and rollers) by a corresponding geometric design. The hatrack comprises a drawer housing (sandwich) with a total of four rollers to be held in the guide rails of the housing. The PSUs functionally correspond to the commonly used components in the cabin, except they provide an advantage in that neither hinges for folding nor excess cable lengths or hose lengths with corresponding abrasion protection sleeves and their separate mounts for fastening are required in their application.

The described hatrack combines implementation of a complex movement path on a closed rail (one rail each side) in each case with two bearing points (ball-bearing mounted polyamide rollers). Although this is a complex movement of the hatrack, maximum reduction in the number of individual components is achieved by the integration of all the desired functions in the design shape of a single component (guide rail). This guide rail itself is present twice for each hatrack module, namely offset in longitudinal direction of the aircraft, in each case as a fixed bearing and as a floating bearing, an arrangement which also makes it possible to provide hatracks over several aircraft frame elements. Since these guide rails lead from the edge surface at the housing sides, simple one-person installation of the roller-guided hatracks by way of self-positioning (insertion inclines) on the rails is possible.

Figure 8:
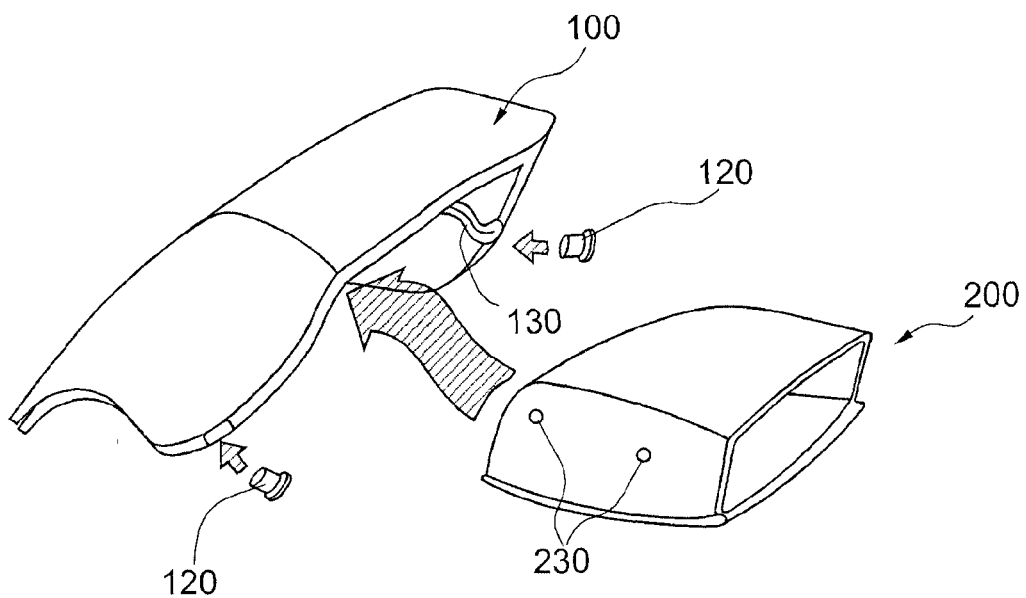
FIG. 8 shows an isometric view of a hatrack prior to installation in the housing of a hatrack module.

As shown in the isometric view in FIG. 8, the rails 130 are closed off in each case by means of a locking plug and end-stop plug 120, in each case held by locating screws, as soon as the guide rollers 230 of a hatrack 200 have been inserted into the guide rails 130.

For additional damping and to provide an end stop, the end-stop plugs can comprise an elastic buffer. Since the housing can be installed on the aircraft structure separately of the hatrack, fastening of the housing is significantly facilitated, for example through installation openings on the rear wall. After installation of the hatrack, these installation openings and the entire inner workings of the hatrack module, which also acts as a visible part, is hidden from view.

Figure 9:
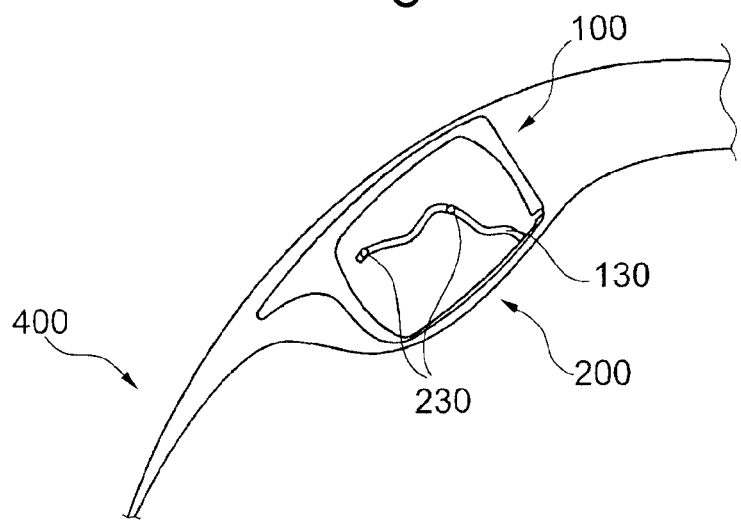
FIG. 9 shows the arrangement of guide rollers on a hatrack in a guide rail.
Figure 10:
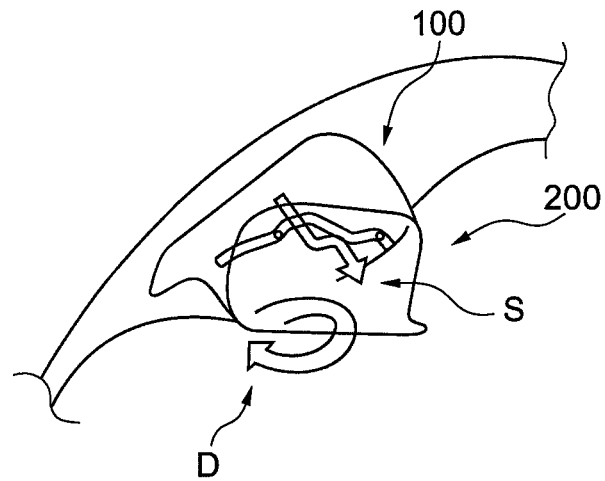
FIG. 10 shows a diagrammatic view that illustrates the movements of the hatrack between the closed position and the open position.

In terms of its end position, the guide rail 130 is designed in such a manner that the closed end position is a position as close as possible to the fuselage (compare FIG. 9), while the open position is a position where loading is made as easy as possible (compare FIG. 10). The design is thus suitable to optimize the pivoting movement, and to minimize dead space (pivoting regions), as well as to provide as generous as possible a cabin in an aircraft.

Figure 11:
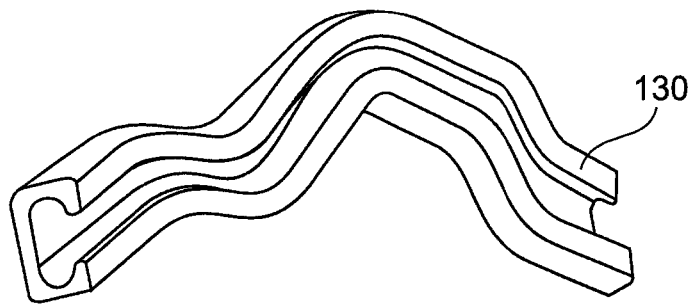
FIG. 11 shows an isometric view of an exemplary guide rail.

However, in the hatrack module with slide-in guide rails described in this document, particular attention has been paid to the defined curve design (compare FIG. 11).

Figure 12:
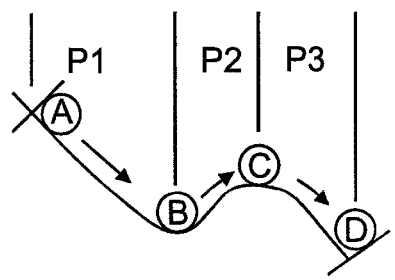
FIG. 12 illustrates the different phases during opening of a hatrack according to the invention.

The movement path during opening (compare phase P1 in FIG. 12) has been selected in such a manner that at first the pivot point is away from the center of gravity towards the structural side in order to ensure guaranteed and quick automatic opening of the hatrack, wherein said pivot point moves continuously towards the center of gravity. The further movement path during opening has been selected so that the pivot point continuously approaches the center of gravity in order to prevent further gravity-induced acceleration.

The further movement path during opening (phase P2 in FIG. 12) results in a change in the pivot point beyond the center of gravity in the direction towards the passenger. During this process the speed of the hatrack is reduced in order to deplete the kinetic energy prior to reaching the end position.

The further movement path during opening (phase P3 in FIG. 12) is then selected in such a manner that the pivot point moves back over the center of gravity of the structural side in order to ensure a safe and secure bearing arrangement of the hatrack in its fully-open end position.

During closing, this very change in the pivot point must be perceptively overcome again as feedback or resistance. The movement path during closing is selected in such a manner that after this resistance has been overcome the pivot point moves away from the center of gravity towards the structural side; in other words the weight of the hatrack supports passengers in their attempt to overcome gravity.

The further movement path to the final closed position is, furthermore, selected in such a manner that after certain kinetic energy has been attained in the previous acceleration phase, final closing can be effected with little manual force. By utilizing the kinetic energy, the required manual forces thus remain within comfortable limits The physical effect that is harnessed in this arrangement is essentially explained by defined interaction between potential and kinetic energy (compare FIG. 12).

It should be noted that the steps of the method for installing a hatrack module according to the invention, which steps are shown in FIGS. 1 to 6, are merely main steps, wherein these main steps can be differentiated in, or divided into, sub-steps. Furthermore, it is also possible to undertake sub-steps between the main steps. A sub-step is mentioned as such only if this step is important to gain an understanding the principles of the method according to the invention.

Although this is a complex movement of the hatrack, maximum reduction in the number of individual components is achieved by the concurrent integration of significant desired effects. In summary, the use of two rails and four bearing rollers makes it possible to achieve optimal ergonomics, to limit the required space, to achieve simple installation, dynamic damping during opening, and dynamic support of manual force during closing.

As far as installation is concerned, the design of the hatrack module makes it possible to divide the module into two components, namely the housing and the hatrack, which components can be divided in an optimized manner for installation. Installation problems and maintenance problems which occur in the conventional design are eliminated in this manner. Installation of the housing is greatly simplified as a result of the ability to access the fastening elements and adjustment elements from the front. There is no need to design the PSUs so that they are foldable, and they are mounted so as to be fixed in place before they are connected to the supply lines in the aircraft structure.

With the use of the hatrack module according to the invention a reduction in the number of components is achieved, as are weight savings. The invention makes it possible to achieve simple installation of the hatrack module, quick installation of the service channel without intermediate steps, safe and reliable installation of the service channel with a corresponding reduction in weight, all without the need for pre-assembly outside the aircraft. The variability and flexibility of the service channel is maintained; test routines of the service channel are maintained; tolerance problems of the service channel in the direction of the aircraft (structure-related tolerances) can be solved with the use of tolerance panels; closed contours of the side lining, the PSC, the hatrack housing and the hatrack, to the ceiling lining, become possible; and, lastly, a design without handles is possible because of gravity-induced self-opening of the hatrack (push-to-open unlocking).

Figure 13:
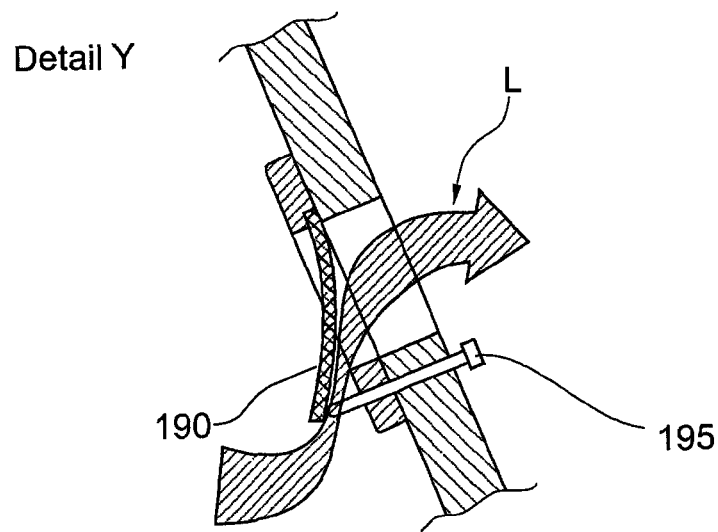
FIG. 13 shows a detailed view of an exemplary valve.

FIG. 13 shows a detailed view of an exemplary valve 190 that can be provided either in a wall of the hatrack accommodation space or in a closing flap 170. The valve shown comprises a valve flap 190 and an adjusting screw 195. The valve flap 190 can be an articulated stiff flap or a flexible membrane. By means of the adjusting screw 195 it is possible to prevent the flap 190 from closing completely; in other words a minimum opening can thus be set. In this manner it can be ensured that in the case of a differential in atmospheric pressure, which differential results in an airflow L (as shown), the quantity of air flowing through in a defined period of time can be set by means of the adjustment screw. As soon as there is a differential in the atmospheric pressure, which differential results in an airflow in the opposite direction, the airflow will open the flap further; consequently the airflow is essentially determined by the size of the pass-through opening.

Depending on the orientation and setting of the valve, in this way air damping of the movement of a hatrack during opening or closing of said hatrack can be influenced or adjusted.

Figure 14:
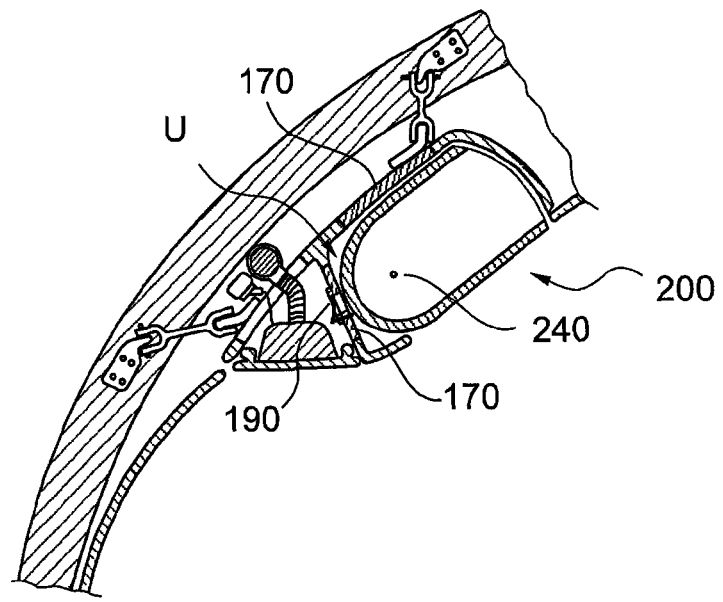
FIG. 14 shows a hatrack module according to a further embodiment of the invention.

FIG. 14 shows a hatrack module according to another embodiment of the invention. In this hatrack module the hatrack 200 is held by means of an axis 240 so that the hatrack follows a circular movement curve or pivoting movement between the open and the closed state. Accordingly, the hatrack accommodation space and the hatrack are designed in such a manner that also during movement of the hatrack a uniform gap exists between the housing and the hatrack, which results in the advantages described above.

While the invention has been illustrated and described in detail in the drawings and in the above description, it is intended for such illustrations and descriptions to be merely illustrative or exemplary rather than being restrictive, so that the invention is not limited by the embodiments disclosed.

Other variations of the disclosed embodiment can be understood and caused by the average person skilled in the art, when implementing the claimed invention, from studying the drawings, the disclosure and the dependent claims. In the claims the term "comprising" does not exclude other elements or steps, and the indefinite article "a" or "an" does not exclude a plural number.

The mere fact that particular features have been mentioned in different dependent claims does not indicate that a combination of these features cannot be used to advantage. The reference signs in the claims are not to limit the extent of the claims.

LIST OF REFERENCE CHARACTERS

100 Housing of the hatrack module
110 Fastening element
120 Locking plug
130 Bearing element
140 Fastening rail
150 Reach-through access opening
160 Passenger service channel
170 Closing plate
180 Hatrack accommodation space
190 Valve
195 Adjusting screw
200 Hatrack
210 Hatrack wall
230 Guide element
240 Bearing element
300 Passenger service unit (PSU)
310, 320, 330 Different PSUs
350, 360 Connections
400 Aircraft structure
410 Fastening element
420 Outside wall
430 Interior lining
450, 460 Supply lines
S Movement of the center of gravity
D Movement of the individual pivot point
U Negative-pressure reservoir
L Airflow

The invention claimed is:
1. A hatrack module comprising:
a housing with a hatrack accommodation space and a passenger service channel,
a first and second bearing elements arranged on each of the first and second sidewalls of the hatrack accommodation space, wherein a wall of the housing between the hatrack accommodation space and the passenger service channel, comprises a reach-through access opening, a hatrack with laterally arranged at least first and second guide elements being engagable with the first and second bearing elements, and at least one passenger service unit.

2. The hatrack module of claim 1, wherein the wall of the housing is a rear wall of the housing.

3. The hatrack module of claim 1, wherein the first and second bearing elements on the hatrack accommodation space are first and second guide rails, respectively, and wherein the at least first and second guide elements of the hatrack are rollers, wherein on each side of the hatrack at least first and second rollers are arranged in such a manner that the hatrack is movable along the first and second guide rails between an open position and a closed position.

4. The hatrack module of claim 3, wherein the housing, further comprises a locking plug configured for closing off one end of one of the first and second guide rail.

5. The hatrack module of claim 1, wherein the at least one passenger service unit is an element selected from the group consisting of: an oxygen supply box, a loudspeaker, a headphone jack, a light, an air outlet for the air supply, a USB connector, a computer connector, and a panel.

6. The hatrack module of claim 1, further comprising a locking device for locking the hatrack in a closed position in the housing.

7. The hatrack module of claim 1, wherein the hatrack module is configured to be integrated in a positive-locking manner in the lining of the interior of an aircraft.

8. The hatrack module of claim 1, wherein the movement path of the hatrack is determined in such a manner that in any position of the hatrack between an open position and a closed position there is an essentially constant gap between an outside of the hatrack and an edge of the housing.

9. The hatrack module of claim 1, further comprising at least one closing plate, by which the at least one reach-through access opening is closed.

10. The hatrack module of claim 9, wherein the closing plate or the wall of the hatrack accommodation space comprises a valve.

11. An aircraft comprising a hatrack module, the hatrack comprising:

a housing with a hatrack accommodation space and a passenger service channel, a first and second bearing elements arranged on each of the first and second sidewalls of the hatrack accommodation space, wherein a wall of the housing between the hatrack accommodation space and the passenger service channel, comprises a reach-through access opening, a hatrack with laterally arranged at least first and second guide elements being engagable with the first and second bearing elements, and at least one passenger service unit.

12. A method for installing a hatrack module of claim 1 in an aircraft, wherein the method comprises:

attaching the housing of the hatrack module to the structure of the aircraft, inserting the at least one passenger service unit in the passenger service channel of the housing, connecting at least one connection of the passenger service unit with supply lines of the aircraft, and inserting a hatrack in the hatrack accommodation space of the housing, wherein the at least first and second guide elements on the hatrack engage the first and second bearing elements of the housing.

\* \* \* \* \*